United States Patent
Pergal et al.

(10) Patent No.: US 11,995,424 B2
(45) Date of Patent: May 28, 2024

(54) IDENTIFYING UNIQUE COMPUTER SOFTWARE IN UNSTRUCTURED TEXT

(71) Applicant: Axonius Solutions Ltd., Tel-Aviv (IL)

(72) Inventors: Guy Pergal, Herzliya (IL); Avi Waserman, Ramat Gan (IL); Coby Soffer, Ramat Gan (IL); Avidor Bartov, Tel-Aviv (IL)

(73) Assignee: Axonius Solutions Ltd., Tel-Aviv (IL)

( * ) Notice: Subject to any disclaimer, the term of this patent is extended or adjusted under 35 U.S.C. 154(b) by 49 days.

(21) Appl. No.: 17/895,082

(22) Filed: Aug. 25, 2022

(65) Prior Publication Data
US 2024/0069882 A1    Feb. 29, 2024

(51) Int. Cl.

| | |
|---|---|
| *G06F 40/284* | (2020.01) |
| *G06F 8/61* | (2018.01) |
| *G06F 8/65* | (2018.01) |
| *G06F 40/30* | (2020.01) |
| *G06F 16/25* | (2019.01) |
| *G06F 16/35* | (2019.01) |
| *G06F 40/279* | (2020.01) |

(52) U.S. Cl.
CPC .......... *G06F 8/61* (2013.01); *G06F 8/65* (2013.01); *G06F 40/284* (2020.01); *G06F 40/30* (2020.01); *G06F 16/258* (2019.01); *G06F 16/35* (2019.01); *G06F 40/279* (2020.01)

(58) Field of Classification Search
CPC ...... G06F 40/284; G06F 40/30; G06F 40/279; G06F 8/61; G06F 8/65; G06F 16/35; G06F 16/258
See application file for complete search history.

(56) References Cited

U.S. PATENT DOCUMENTS

| | | | |
|---|---|---|---|
| 2013/0325882 A1* | 12/2013 | Deshpande | G06F 16/211 |
| | | | 707/755 |
| 2017/0270195 A1* | 9/2017 | Zhang | G06Q 30/0255 |
| 2020/0034479 A1* | 1/2020 | Winzenried | G06F 16/334 |
| 2021/0350485 A1* | 11/2021 | Majumdar | G06N 20/00 |
| 2022/0237934 A1* | 7/2022 | Matcham | G06F 18/285 |

OTHER PUBLICATIONS

Victor Andres et al., A New Cloud Computing Architecture for the Classification of Remote Sensing Data, Feb. 2017, [Retrieved on Feb. 13, 2024]. Retrieved from the internet: <URL: https://ieeexplore.ieee.org/stamp/stamp.jsp?tp=&arnumber=7567537> 8 Pages (409-416) (Year: 2017).*

* cited by examiner

*Primary Examiner* — Anibal Rivera

(57) ABSTRACT

There is provided a computing device for identifying unique software installed on network connected devices, comprising: a processor executing a code for: for each unstructured text for the network connected devices, wherein the unstructured texts are extracted by different code sensors from different applications, wherein each unstructured text indicates an identity of software installed on device(s): dividing the unstructured text into token(s), classifying tokens to software parameter(s) using classification dataset(s), matching subsets of permutations of the software parameters and corresponding tokens to unique software identifiers defined by a common structured format, selecting one unique software identifier according to a set of rules, and generating a text satisfying the common structured format, the text indicating unique software installed on each device.

21 Claims, 5 Drawing Sheets

404 → Microsoft Windows Internet Explorer 11 x86

406 → Microsoft Windows Internet Explorer 11 x86
       Vendor   Product        Vendor   Ver  Arc
                      Product 408 → cpe:/a:microsoft:windows:11
      cpe:/a:microsoft:internet_explorer:11

410 → cpe:/a:microsoft:internet_explorer:11

FIG. 4

IDENTIFYING UNIQUE COMPUTER SOFTWARE IN UNSTRUCTURED TEXT

FIELD AND BACKGROUND OF THE INVENTION

The present invention, in some embodiments thereof, relates to data analysis and, more specifically, but not exclusively, to systems and methods for analysis of unstructured text.

Unstructured text is text that does not have a pre-defined format, and is not organized in a pre-defined manner. Unstructured text includes alphanumeric characters. Raw unstructured text is difficult to process automatically, since it generates irregularities and ambiguities, in contrast to structured text that is stored in a specific well defined format.

SUMMARY OF THE INVENTION

According to a first aspect, a computing device for identifying unique software installed on a plurality of network connected devices, comprises: at least one processor executing a code for: for each unstructured text of a plurality of unstructured texts for the plurality of network connected devices, wherein the plurality of unstructured texts are extracted by different code sensors from different applications, wherein each unstructured text indicates an identity of at least one software installed on at least one device of the plurality of devices: dividing the unstructured text into at least one token, classifying tokens to at least one software parameter using at least one classification dataset, for obtaining a plurality of software parameters for the unstructured text, matching subsets of permutations of the plurality of software parameters and corresponding tokens to a plurality of unique software identifiers defined by a common structured format, selecting one unique software identifier from the plurality of unique software identifiers according to a set of rules, and generating a text satisfying the common structured format, the text indicating at least one unique software installed on each device.

According to a second aspect, a method for identifying unique software installed on a plurality of network connected devices, comprises: using at least one processor for: or each unstructured text of a plurality of unstructured texts for the plurality of network connected devices, wherein the plurality of unstructured texts are extracted by different code sensors from different applications, wherein each unstructured text indicates an identity of at least one software installed on at least one device of the plurality of devices: dividing the unstructured text into at least one token, classifying tokens to at least one software parameter using at least one classification dataset, for obtaining a plurality of software parameters for the unstructured text, matching subsets of permutations of the plurality of software parameters and corresponding tokens to a plurality of unique software identifiers defined by a common structured format, selecting one unique software identifier from the plurality of unique software identifiers according to a set of rules, and generating a text satisfying the common structured format, the text indicating at least one unique software installed on each device.

According to a third aspect, non-transitory medium storing program instructions for identifying unique software installed on a plurality of network connected devices, which, when executed by at least one processor, cause the at least one processor to: for each unstructured text of a plurality of unstructured texts for the plurality of network connected devices, wherein the plurality of unstructured texts are extracted by different code sensors from different applications, wherein each unstructured text indicates an identity of at least one software installed on at least one device of the plurality of devices: divide the unstructured text into at least one token, classify tokens to at least one software parameter using at least one classification dataset, for obtaining a plurality of software parameters for the unstructured text, match subsets of permutations of the plurality of software parameters and corresponding tokens to a plurality of unique software identifiers defined by a common structured format, select one unique software identifier from the plurality of unique software identifiers according to a set of rules, and generate a text satisfying the common structured format, the text indicating at least one unique software installed on each device.

In a further implementation form of the first, second, and third aspects, further comprising: analyzing a plurality of unique software identifiers for the plurality of devices to identify at least one unique software product for which a security vulnerability is known, and generating instructions for obtaining a patch for the security vulnerability and installing the patch on at least one device on which a unique software product with the security vulnerability is installed.

In a further implementation form of the first, second, and third aspects, further comprising: analyzing a plurality of unique software identifiers for the plurality of devices to identify at least one unique software product installed as an older version for which an update for installation is available, and generating instructions for obtaining the update and installing the update on at least one device on which the older version of the at least one unique software product is installed.

In a further implementation form of the first, second, and third aspects, further comprising: analyzing a plurality of unique software identifiers for the plurality of devices in view of available licenses to identify at least one of: unique software products without an associate license, and surplus licenses not being used.

In a further implementation form of the first, second, and third aspects, the at least one code sensor extracts data from at least one application that at least one of: interacts, manages, and monitors, with software installed on the device for which the unique identifier is being determined.

In a further implementation form of the first, second, and third aspects, the at least one application is selected from a group consisting of: device and user management consoles, endpoint security agents, networking, identity access management, vulnerability management, patch management, and cloud provider.

In a further implementation form of the first, second, and third aspects, the common structured format is defined by a common platform enumeration (CPE) structured name scheme.

In a further implementation form of the first, second, and third aspects, further comprising looking up a token of the unstructured text in an alias dataset that maps aliases to words, to identify at least one word, and adding the at least one word to the at least one token, wherein the classifying includes the at least one token.

In a further implementation form of the first, second, and third aspects, the classification dataset is implemented as at least one directed acyclic graph (DAG), wherein each vertex of the at least one DAG denotes a single word, and an edge between vertices denotes a sequence of related words.

In a further implementation form of the first, second, and third aspects, the classifying is performed by finding a root vertex with a first word, and tracing a path in the DAG to addition vertices corresponding to additional words by connected edges, until a leaf vertex is reached.

In a further implementation form of the first, second, and third aspects, further comprising merging at least two tokens into a single token according to the path that passes through at least two vertices connected by an edge.

In a further implementation form of the first, second, and third aspects, the at least one software parameter is selected from a group comprising: software product, vendor, version, architecture, and year.

In a further implementation form of the first, second, and third aspects, matching comprises identifying a vendor, identifying a software product, and identifying that a vendor has the software product in an inventory.

In a further implementation form of the first, second, and third aspects, when a plurality of vendors having a same software product in a plurality of inventories are found, a single vendor with widest distribution of the same software product is selected.

In a further implementation form of the first, second, and third aspects, the software product is identified from tokens that are unclassified as vendors.

In a further implementation form of the first, second, and third aspects, the set of rules for selecting one unique identifier includes selecting according to widest distribution.

In a further implementation form of the first, second, and third aspects, the set of rules for selecting one unique identifier includes removing unique identifiers indicating an operating system.

In a further implementation form of the first, second, and third aspects, the unstructured text comprises free-text.

In a further implementation form of the first, second, and third aspects, the at least one classification dataset comprises a plurality of software products obtained from at least one data source.

In a further implementation form of the first, second, and third aspects, when a token is not found in the at least one classification dataset, further comprising determining the at least on software parameter according to an analysis of the token identified in a plurality of environment.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is an example of implementing features 204-210 of FIG. 2, in accordance with some embodiments of the present invention.

Figure 1:
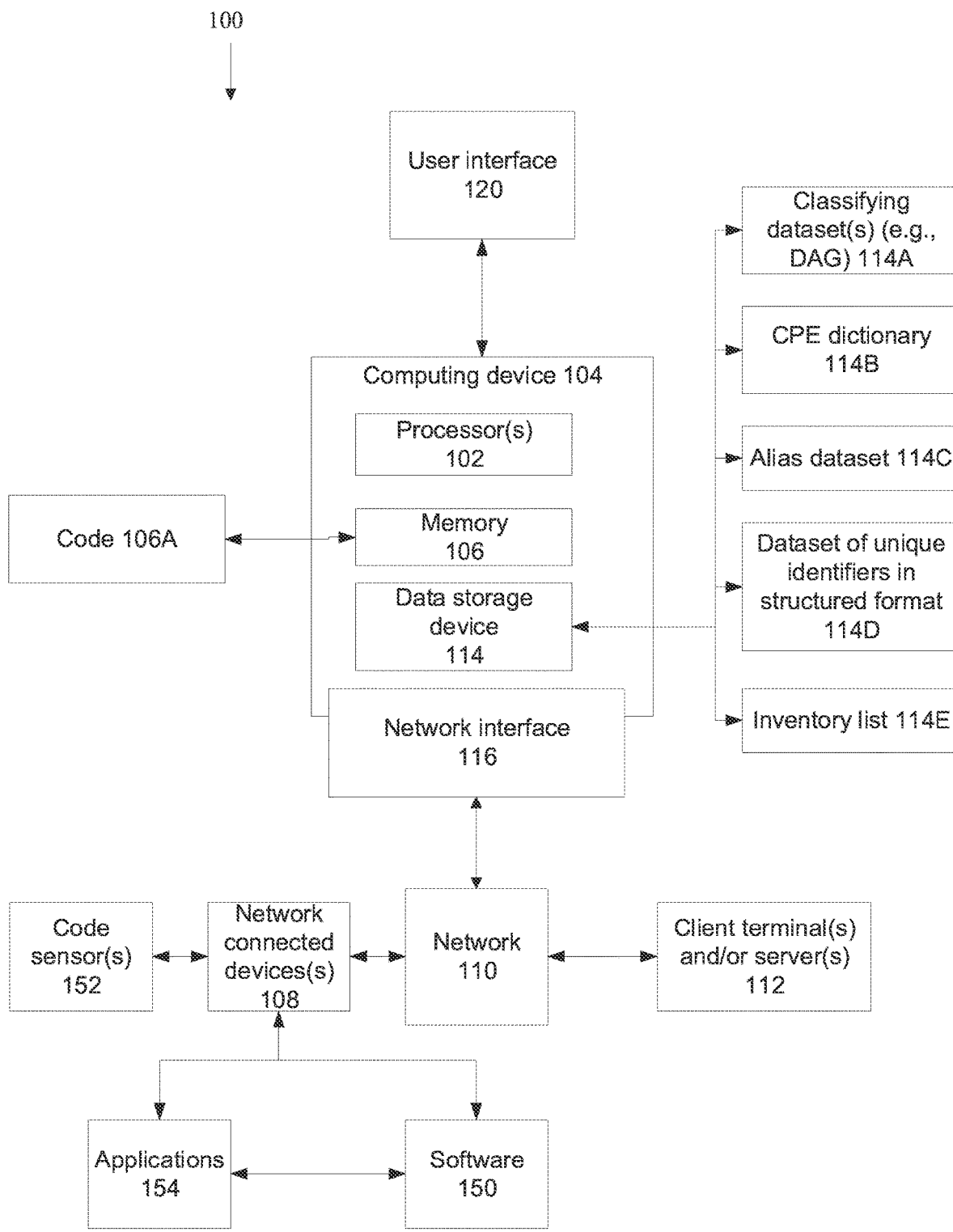
FIG. 1 is a block diagram of components of a system for identifying unique software installed on a plurality of network connected devices, in accordance with some embodiments of the present invention.

DESCRIPTION OF SPECIFIC EMBODIMENTS
OF THE INVENTION

The present invention, in some embodiments thereof, relates to data analysis and, more specifically, but not exclusively, to systems and methods for analysis of unstructured text.

An aspect of some embodiments of the present invention relates to computing devices, systems, methods, and/or code instructions (stored on a data storage device and executable by one or more hardware processors) for identifying unique software installed on multiple network connected devices. Multiple unstructured texts from multiple network connected devices having one or more software installed thereon are provided. The unstructured texts may be obtained from one or more different code sensors that extract the unstructured texts from different applications, for example, security applications and/or network and/or device management applications. The unstructured texts are in no particular format. Each unstructured text indicates a unique identity of one or more software programs installed on each respective client terminal, however, the unique identify of each software is "buried" within the unstructured text. For example, a person reading the unstructured text cannot determine the unique identity of the software program with certainty, since for example, the unstructured text may appear to correspond to identities of multiple different software programs. For each unstructured text, the processor divides the unstructured text into one or more tokens. The processor classifies each token to one or more software parameters using one or more classification datasets. Multiple software parameters are obtained for each token. The processor matches multiple subsets of different permutations of the software parameters and corresponding tokens to unique software identifiers defined by a common structured format, optionally defined by a common platform enumeration (CPE) standard, defined and maintained by the National Institute of Standards and Technology (NIST) as part of the Security Content Automation Protocol (SCAP). The processor applies a set of rules and selects a single unique software identifier from the multiple unique software identifiers. The processor generates a text satisfying the common structured format, optionally CPE. The text indicate one or more unique software installed on each client terminal.

At least some implementations of the systems, methods, devices, and/or code instructions described herein address the technical problem of detecting unique installed software from unstructured text. For example, it is unclear which software the unstructured text "Microsoft Windows Internet Explorer 11" refers to. Although there is a software called "Microsoft Windows 11", this string refers to the software "Microsoft internet explorer", which has the CPE "cpe:/a: microsoft:internet_explorer:11".

At least some implementations of the systems, methods, devices, and/or code instructions described herein improve the technology of network management, in particular, managing software installed on client terminals of a network.

There are multiple uses cases that require detecting unique installed software from unstructured text. For example, to answer the question "How many devices do I have with Microsoft Office installed?". The answer to the question may be used, for example, to determine how many updates to perform, how many software licenses are needed, and the like. The technical problem is that the data about installed software may be extracted from multiple sources that generate text in different unstructured formats, for example, extracted from security applications, extracted from anti-malware applications, and extracted from applications that manage network devices, and the like. As such, it is difficult to determine that a string such as "MS-Office 2016 X86" refers to the same installed software as the string "Office by Microsoft". Another example of a use case is vulnerability assessment. In order to use a dictionary with all known common vulnerabilities and exposures (CVEs), related to a list of software, the exact, expected software identifier is to be extracted from the obtained unstructured text.

At least some implementations of the systems, methods, devices, and/or code instructions described herein improve over existing approaches. For example, some existing approaches use a heuristic algorithm to match the free text against the entire CPE dictionary. This results in poor performance, and non-accurate results in most real-world applications.

At least some implementations described herein address the above mentioned technical problem, improve the above mentioned technical field, and/or improve over existing approaches, by computing a unique identifier for a software installed on network connected device, optionally CPE, in response to unstructured text, optionally free-text. The complexity of the approach described herein is O(m), where 'm' is the string size. Hence the performance is good to run on a large dataset with the highest accuracy measured compared to all existing solutions found.

The systems, methods, apparatus, and/or code instructions described herein do not simply perform automation of a manual procedure, but perform automated features which cannot be performed manually by a human using pencil and/or paper and/or cannot practically be performed by a human. Moreover, implementations described herein are different than manual approaches. Using manual approaches, a human accesses each network connected device, and looks up which software is installed, for example, using a control panel application, opening up each application and clicking the 'about' icon, and the like. Clearly, manual approaches become impractical for a large number of network connected devices, which may be of different types, and/or in an environment in which software is repeatedly updated usually automatically. Implementations described herein provide an automatic approach for deterministically, accurately, and repeatedly, determining the unique software identifier (e.g., CPE) from many unstructured texts, extracted by different code sensors from different types of applications. The different unstructured texts may actually refer to the same unique software identifier, which is correctly and deterministically automatically determined. In contrast, a human cannot accurately determine what the unique identifier is for the unstructured text, which may appear to correspond to multiple different software applications. Moreover, the approach described herein is O(m), enabling computational efficient scaling, for handling a large volume of unstructured texts from a large number of code sensors monitoring a large number of applications that each interact, manage, and/or monitor multiple software installed on the network connected devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
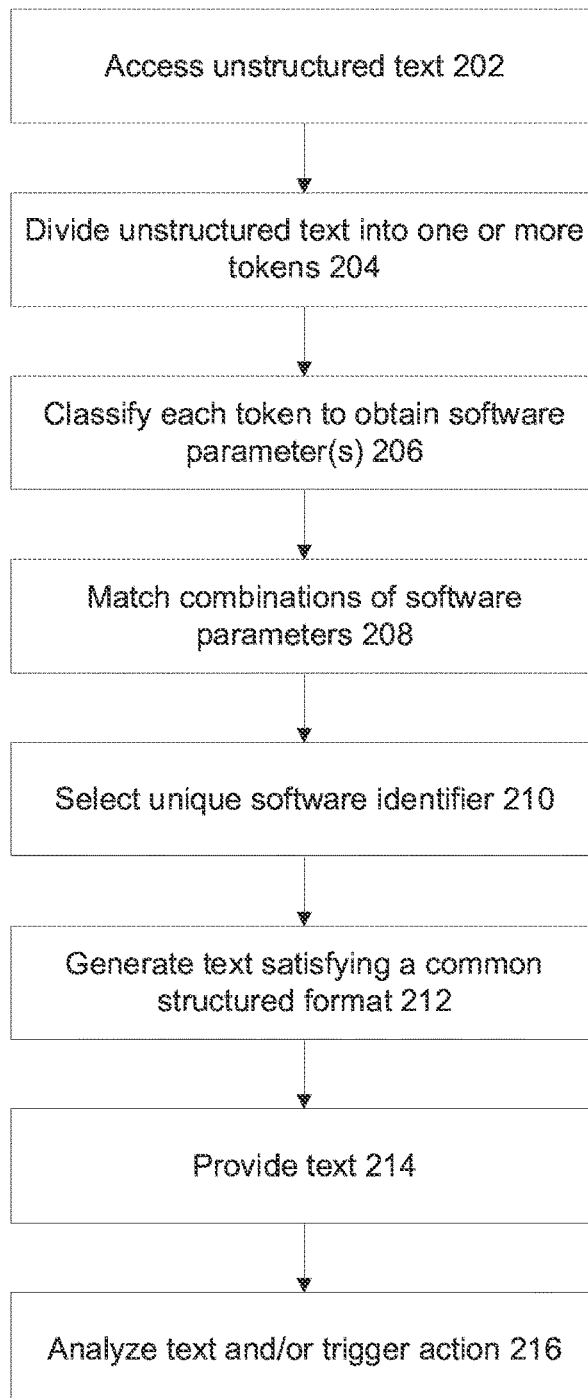
FIG. 2 is a flowchart of a method for identifying unique software installed on a plurality of network connected devices, in accordance with some embodiments of the present invention.
Figure 3:
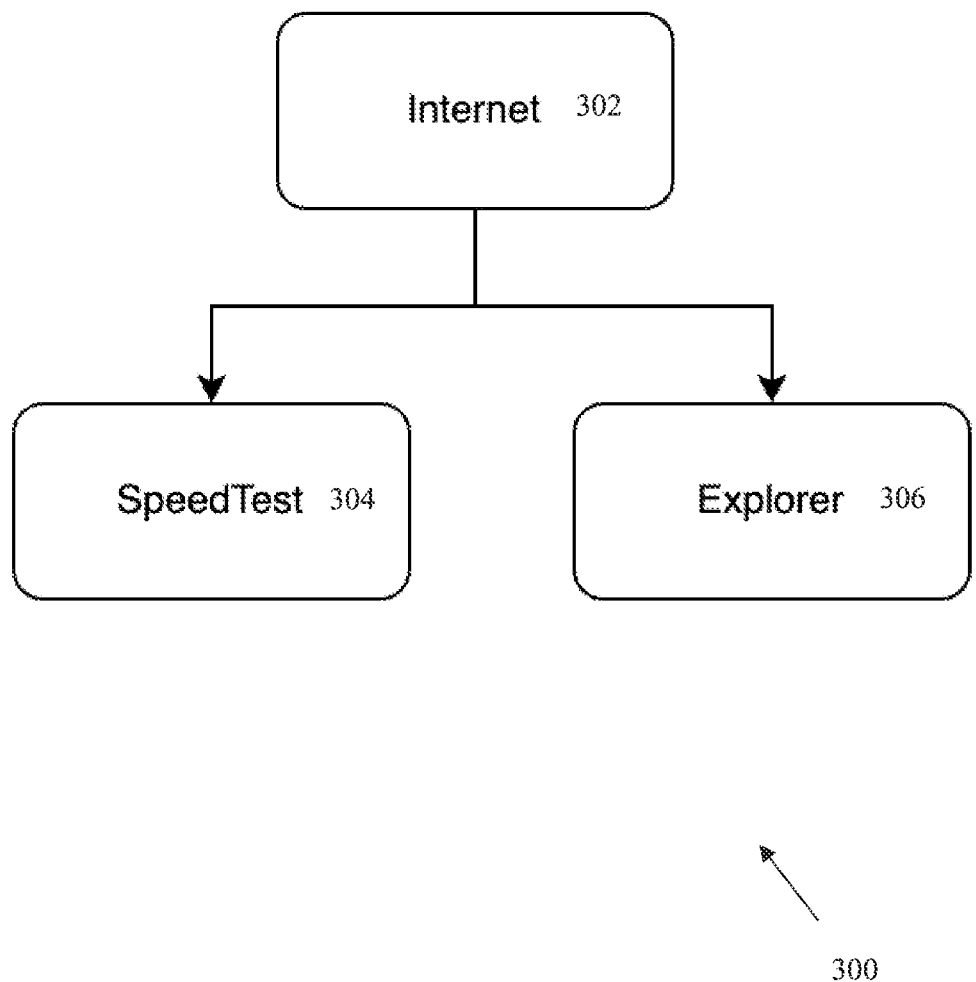
FIG. 3 is a schematic of a simple DAG for classifying tokens to software parameters, to help understand some embodiments of the present invention.
Figure 5:
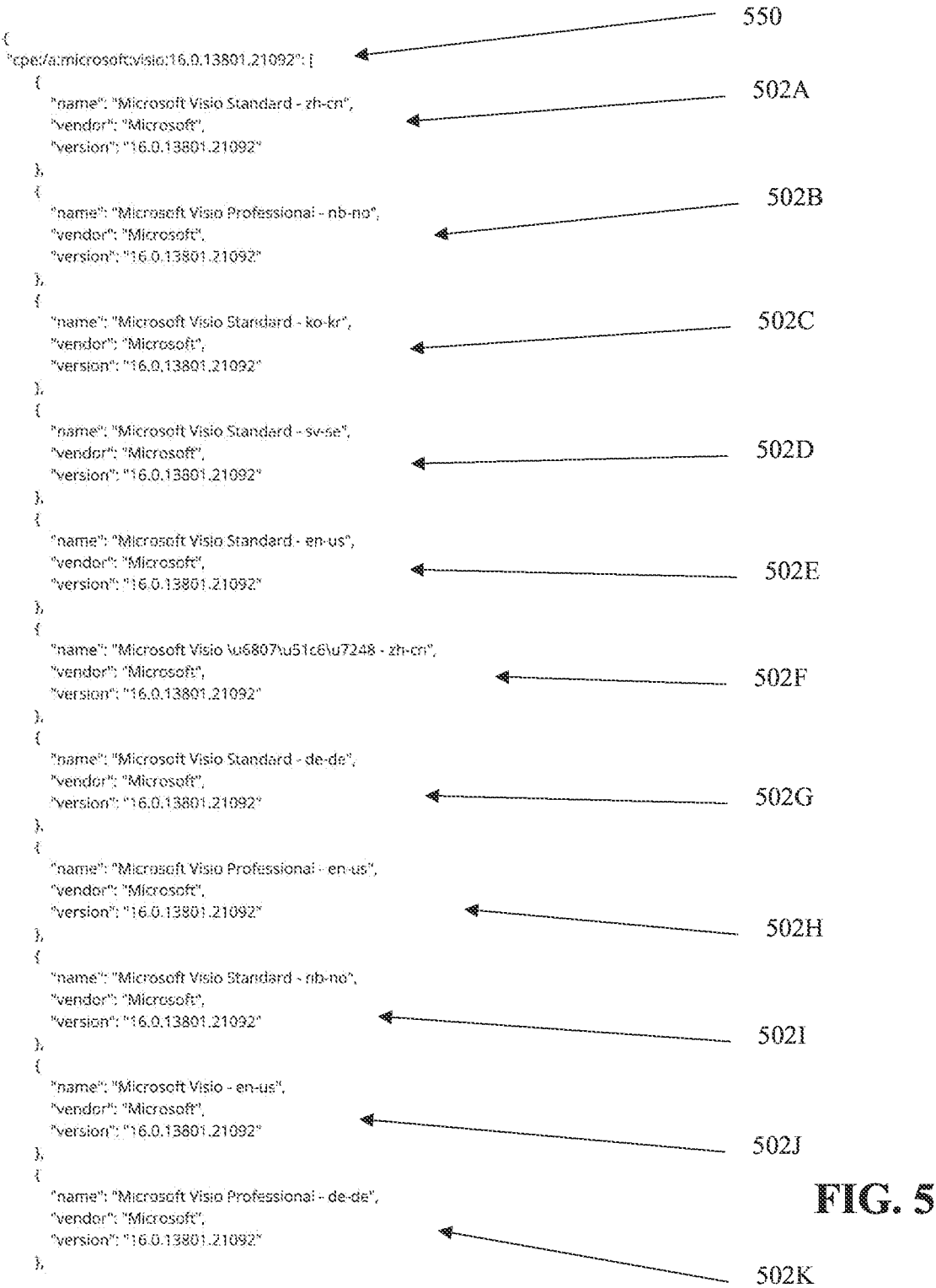
FIG. 5 is an example of multiple different combinations of product names, vendors, and versions, that all map to the same CPE.

Reference is now made to FIG. 1, which is a block diagram of components of a system 100 for identifying unique software installed on a plurality of network connected devices 108, in accordance with some embodiments of the present invention. Reference is also made to FIG. 2, which is a flowchart of a method for identifying unique software installed on a plurality of network connected devices, in accordance with some embodiments of the present invention. Reference is now made to FIG. 3, which is a schematic of a simple DAG 300 for classifying tokens to software parameters, to help understand some embodiments of the present invention. Reference is now made to FIG. 4, which is an example of implementing features 204-210 of FIG. 2, in accordance with some embodiments of the present invention. Reference is now made to FIG. 5, which is an example of multiple different combinations 502A-502K of product names, vendors, and versions, that all map to the same CPE 550.

System 100 may implement the acts of the method described with reference to FIGS. 2-5 by processor(s) 102 of a computing device 104 executing code instructions stored in a memory 106 (also referred to as a program store).

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

As used herein, the term network connected devices 108 may refer to one or more of: client terminal(s), server(s), virtual machines, computing cloud, mobile devices, and/or network devices of a network 110 such as a router, bridge, and the like. Computing device 104 may be included within the term network connected device 108.

Multiple architectures of system 100 based on computing device 104 may be implemented. For example:

A centralized architecture. Computing device 104 executing stored code instructions 106A, may be implemented as one or more servers (e.g., network server, web server, a computing cloud, a virtual server) that provides centralized services (e.g., one or more of the acts described with reference to FIGS. 2-5) to one or more client terminals 112 (and/or servers) over a network 110. For example, providing software as a service (SaaS) to the client terminal(s) 112 (and/or servers), providing software services accessible using a software interface (e.g., application programming interface (API), software development kit (SDK)), providing an application for local download to the client terminal(s) 112 (and/or servers), providing an add-on to a web browser running on client terminal(s) 112 (and/or servers), and/or providing functions using a remote access session to client terminal(s) 112 (and/or servers), such as through a web browser executed by client terminal(s) 112 (and/or servers) accessing a web site hosted by computing device 104. For example, unstructured text of different formats (e.g., obtained by multiple different code sensor 152 monitoring applications 154 that manage, monitor and/or interact with software 150 for which unique identifiers are sought) is provided to computing device 104, for example, from code sensor(s) 152 over network 110. Computing device 104 generates unique software identifiers of a common structured format (e.g., CPE) for software 150 installed on network connected devices 108, as described herein. The unique software identifiers may be provided back to the client terminal 112 (and/or server) that triggered a request to obtain the unique software identifiers, for example, for presentation on a display. For example, a network administrator uses a remote client terminal 112 to access server 104 to obtain unique software identifiers for software 150 installed on network connected devices 108, for example, for installing updates, determining licenses, and/or installing patches for security vulnerabilities.

A local architecture. Computing device 104 executing stored code instructions 106A that implement one or more of the acts described with reference to FIGS. 2-5 may be implemented as a standalone device, for example, a web server hosting one or more web sites, a kiosk or other terminal (e.g., tourist information boot), a client terminal, or a smartphone. Computing device 104 locally generates unique identifiers for software 150 installed on computing device 104.

A combined local-central architecture. Computing device 104 may be implemented as a server that include locally stored code instructions 106A that implement one or more of the acts described with reference to FIGS. 2-5, while other acts described with reference to FIGS. 2-5 are handled by client terminal(s) 112 (and/or server(s)). For example, computing device 104 generates unique identifiers for software 150 installed on network connected devices 108. The unique identifiers may be presented on a user interface (e.g., display) 120 of computing device 104.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-5 when executed by hardware processor(s) 102.

Computing device 104 may include a data storage device 114 for storing data, for example, classifying datasets 114A that maps tokens to software parameters(s), CPE dictionary 114B that includes the set of unique software identifiers, alias dataset 114C that maps an alias to a full word(s), and/or dataset of unique identifiers in a common structured format 114D (which were generated by computing device 104), as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 116 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 may be in communication with network connected devices 108 and/or client terminal(s) and/or servers 112 via network 110.

Computing device 104 includes and/or is in communication with one or more physical user interfaces 120 that include a mechanism for a user to enter data (e.g., select input video) and/or view data (e.g., view the highlight videos). Exemplary user interfaces 120 include, for example, one or more of, a touchscreen, a display, a virtual reality display (e.g., headset), gesture activation devices, a keyboard, a mouse, and voice activated software using speakers and microphone.

Software 150 for which unique identifiers are generated may be installed, for example, on one or more of computing device 104, network connected device(s) 108 and/or client terminal(s) and/or server(s) 112.

Code sensor(s) 152 may extract unstructured text from applications 154 that monitor, interact with, and/or manage software 150 for which unique identifiers are sought.

Example of applications 154 include device and user management consoles, endpoint security agents, networking, identity access management, vulnerability management, patch management, and cloud provider.

Examples of software 150 include most or all of the software installed on network connected devices 108, for example, browsers, spreadsheet, graphic design, document editing, web browser, games, email, videoconference, and the like.

Referring now back to FIG. 2, at 202, the processor accesses one or more unstructured texts per network connected device.

The unstructured text may include alphanumeric characters and/or other symbols, for example, periods, dashes, slashes, and back slashes. The unstructured text may include free-text. The unstructured text is in no particular format.

Each unstructured text indicates a unique identity of one or more software applications installed on the respective client terminal from which the unstructured text has been extracted. However, the unique identity of the software application cannot be accurate determined by a human reading the unstructured text, for example, due to the formatting of the identity of the software application and/or the presence of additional characters. As such, a human viewing the single unstructured text may at best determine multiple possible corresponding software applications, without the ability to narrow down to any specific one.

The unstructured texts are extracted by different code sensors from different applications, which may run on the different client terminals. The applications from which the code sensors extract the unstructured texts may be, for example, the software for which the unique identifier is being determined, and/or applications that interact, manage, and/or monitor software for which the unique identifier is being determined. Examples of applications from which the code sensors extract unstructured texts include, for example, device and user management consoles, security agents, networking, identity access management, vulnerability management, patch management, and cloud providers. Optionally, each unstructured text is extracted by a single corresponding code sensor. The same code sensor may extract multiple different unstructured texts. Optionally, each unstructured text indicates a single software program running on the computing device from which the unstructured text is extracted.

Features described with reference to 204-210 may be implemented per unstructured text. For clarity, features 204-210 are described with reference to a single unstructured text, but it is to be understood that the features may be performed for each unstructured text. Features described with reference to 212-216 may be implemented for the multiple unstructured texts, and/or per unstructured text.

At 204, the processor divides the unstructured text into one or more tokens, for example, by a parser process. The unstructured text may be divided, for example, based on known words in a dictionary, according to spacing, and/or according to special characters such as non-alphabet characters and/or symbols.

Optionally, tokens (e.g., each token) is looked-up in an alias dataset that maps aliases to words. For example, MS is mapped to "Microsoft" and IE is mapped to "Internet Explorer". When a token matches an alia, one or more words are obtained. The obtained words are added as new tokens to the original tokens obtained from the unstructured text. Optionally, two alias datasets are created. One alias dataset is for software products (denoted Ap) and another alias dataset is for software vendors (denoted Av).

Tokens that do not represent words may be removed, for example, symbols.

At 206, the processor classifies tokens to one or more software parameters. A single token may be classified to one or more software parameters, and/or a sequence of two or more tokens may be classified to one or more software parameters. Optionally, all of the tokens and/or permutations thereof are evaluated to identify the possible software parameters. For example, when the tokens include: A, B, C, and D, each one of A, B, C, and D alone may be classified, and permutations thereof may be classified, for example, AB, ABC, ABCD, BC, and CD.

Multiple sets of software parameters are obtained for the unstructured text, from the multiple software parameters of the different token(s) of the unstructured text.

Exemplary software parameters include software product, vendor, version, architecture, and year. For example, the token "X86" is classified as architecture.

When two or more sequential tokens represent a same product or vendor, the sequential tokens may be merged into a single token of the relevant software parameter.

The outcome of the classification process may be a set of values of software parameters (e.g., candidate software products, vendors, versions of software, and/or architectures) that the unstructured text may refer to. It is noted that the unstructured text may refer to one or more unique software products. An example is described with reference to FIG. 4.

The classification may be done using one or more classification datasets. An exemplary classification dataset is implemented as one or more directed acyclic graphs (DAG). The DAG is designed for improving performance of the processor performing the classification, by reducing processing time, and/or reducing processor utilization for classifying tokens to software parameters. Each vertex of the DAG denotes a single word. An edge between vertices denotes a sequence of related words. The classifying of the tokens is performed using the DAG by finding a root vertex with a first word, and tracing a path in the DAG to addition vertices corresponding to additional words by connected edges, until a leaf vertex is reached. Two or more tokens are merged into a single token according to the path that passes through two or more vertices connected by an edge. The process of looking up tokens in the DAG is repeated by sequentially moving along the tokens.

Optionally, two sets of DAGs are accessed and/or created. One set is for classifying tokens to vendors of software (e.g., denoted vendor's graph Gv), and a second set is for classifying tokens to software products (e.g., denoted products' graph Gp).

Each token may be run through one or more DAGS, optionally all available DAGs to determine all the possible classifications.

Alternatively or additionally, the classification dataset includes multiple software products, which may be obtained from one or more data sources, for example, from online databases, and/or products offered by different software vendors.

Optionally, a token is not found in the classification dataset(s). In such a case, for an unknown token, one or more automated approaches may be used to classify the unknown token, for example, based on heuristics, structure, and/or knowledge from multiple environments. For example, if the unknown token is detected in multiple environments, the token may be classified into the software parameter(s) according to an analysis of the environments. The environment(s) may be defined by one or more environmental parameters, for example, processor hardware, user or administrator, software executing in parallel, operating system, computing hardware (e.g., mobile device, laptop, smartphone, desktop, server), and the like. For example, if the token is a valid domain, the token may refer to a vendor. The unknown token may be fed into a trained machine learning model that classified the unknown token into software parameter(s). One or more environment parameters may be fed into the machine learning model. The machine learning model may be trained on a training dataset of multiple records, where each record includes a sample token, optionally sample environment parameters, and a ground truth of the classified software parameter. The classified unknown token may be added to the classification dataset(s) to enable quicker classification the next time the token is used.

Referring now back to FIG. 3, DAG 300 is used for classifying tokens to software products (i.e., an example of software parameters). DAG 300 represents two software products. The first software product "Internet SpeedTest" is represented by traversing from node 302 denoting "Internet" to node 304 denoting "SpeedTest". The second software product "Internet Explorer" is represented by traversing from node 302 denoting "Internet" to node 306 denoting "Explorer".

At 208, the processor matches multiple different subsets of combinations of the software parameters and corresponding tokens to multiple unique software identifiers defined by a common structured format, optionally CPE. The goal is to generate one or more candidate unique software identifiers.

The matching may be done by identifying a vendor in a predefined list of vendors, identifying a software product in a predefined list, and/or identifying that a vendor has the software product in an inventory list. The processor obtains the CPE mapped to the identified software product that is provided by the identified vendor.

The inventory list may be accessed and/or created in a step prior to implementation of feature 208. The inventory list includes multiple records, represented as, for example, a table, set of records, and/or mapping dataset. Each record of the inventory list includes the set of {Vendor Name, Software Name, Version}. Records may be create, for example, manually by a user and/or using automation scrips that scrub known data sets.

Consider the case of token(s) being classified as vendor, one or more vendors are found for the classified tokens, and other tokens are not classified as vendors. The tokens not classified as vendor may be run against the list of products offered by the matching vendor, in an attempt to find a matching software product even when the classification of the token into software product failed. It is noted that in some cases, the vendor name and software product are the same.

Consider another case of token(s) being classified as software product, and no tokens are classified as vendor. The tokens classified as software product are run against all software product inventories of all vendors in an attempt to find a match. Alternatively, the software product and vendor are the same.

When multiple vendors having a same software product in multiple inventories are found, a single vendor is selected, for example, the vendor with widest distribution of the same software product and/or vendor with largest number of different products in their inventor. The software product may be identified from tokens that are unclassified as vendors, i.e., assuming that a certain token(s) is only classified as software or vendor, the tokens not classified as vendors represent software.

In the case of a token being classified as a software version, the product and/or vendor may be identified based on the software version alone such as when the software version is unique, for example, unique combination of date of release and/or major version and/or minor version and/or patch version and/or version format.

Referring now back to FIG. 5, CPE 550 is selected when any one of the combinations 502A-502K if product name, vendor, and version, is matched.

Referring now back to FIG. 2, at 210, the processor selects a single unique software identifier for the unstructured text. The single unique software identifier is selected from the multiple unique software identifies identified during the matching step described with reference to 208. The selection may be done according to a set of rules.

Optionally, the set of rules for selecting the unique identifier is selecting the unique identifier that is most popular, for example, for two unique identifiers, one of a vendor with 10 products, and a second with a vendor with 100 products, the second unique identifier is selected. In another example, for two unique identifiers, one installed on 50 devices, and a second installed on 12 devices, the first is selected.

In another example, the set of rules for selecting one unique identifier includes removing unique identifiers indicating an operating system. For example, for two unique identifiers, when one is an operating system and a second is not an operating system, the second is selected. This may be based on the assumption that the non-operation system software runs on the operating system, i.e., the operating system provides the context for the non-operating system software.

In another example, the set of rules for selecting one unique identifier are based on an analysis of multiple CPEs from multiple different unstructured texts. For example, when the same CPE appears 5 times from 5 different unstructured texts from 5 different code sensors, and another CPE appears 1 time from a single code sensor, the CPE that appears 5 times is more likely to be correct. Heuristic approaches may be used to reduce computational complexity of analyzing different subsets of CPEs.

Referring now back to FIG. 4, At 404, the unstructured text "Microsoft Windows Internet Explorer 11 x86" is divided into the following tokens: "Microsoft", "Windows", "Internet", "Explorer", "11", and "x86". For example, as described with reference to 204 of FIG. 2.

At 406, "Microsoft" is classified as vendor, "Windows" is classified as product, "Explorer" is classified as vendor, "11" is classified as version, and "x86" is classified as architecture. The sequential tokens "Internet" and "Explorer" are combined into a single token "Internet Explorer" which is classified as product. The classification of the sequential tokens may be done using the DAG, as described herein. For example, as described with reference to 206 of FIG. 2.

At 408, different permutations of the tokens and classifications are matched to the unique software Microsoft Windows 11, and Microsoft Internet Explorer 11. For example, by looking up the permutations in a list of vendors to identify the vendor, in a list of products to identify the product, and in the list of products offered by the vendor, as described herein. The unique software may be identified using CPEs: "cpe:/a:Microsoft:windows:11" and "cpe:/a.microsoft:internet_explorer:11". For example, as described with reference to 208 of FIG. 2.

At 410, a single unique identifier is selected from the two unique identifiers. Microsoft Internet Explorer 11, represented by CPE "cpe:/a.microsoft:internet_explorer:11" is selected, for example, based on the set of rules that excludes operating system, i.e., Microsoft Windows 11 is excluded due to being an operating system, leaving Microsoft Internet Explorer 11. For example, as described with reference to 210 of FIG. 2.

Referring now back to FIG. 2, at 212, the processor may generate a text satisfying the common structured format, optionally CPE. The text may indicate the multiple unique software installed on the multiple devices. For example, the text may be a list of devices, and unique software installed on each device. In another example, the text may be a list of unique software, and devices on which each unique software is installed.

At 214, the processor may provide the text and/or unique identifiers, for example, presented on a display, fed into an automated process (e.g., as described with reference to 216), stored on a data storage device, and/or forwarded to another device.

At 216, the processor analyses the text and/or unique identifiers. The processor may trigger one or more automated actions based on the analysis.

Optionally, the unique software identifiers for the devices are analyzed to identify one or more unique software products for which a security vulnerability is known, for example, by looking-up the unique identifiers in a list of known security vulnerabilities. The processor may generate and/or execute instructions for obtaining a patch for the security vulnerability and installing the patch on the devices on which a unique software product with the security vulnerability is installed.

Alternatively or additionally, the unique software identifiers for the devices are analyzed to identify one or more unique software products installed as an older version for which an update for installation is available. For example, by looking-up the unique identifiers in a list of available updates. The processor may generate and/or execute instructions for obtaining the update and installing the update on device(s) on which the older version of the unique software product is installed.

Alternatively or additionally, the unique software identifiers for the devices are analyzed in view of available licenses to identify unique software products without an associate license, and/or surplus licenses not being used. For example, by looking-up the unique identifiers in a list of known licenses.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant software programs will be developed and the scope of the term software is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computing device for identifying unique software installed on a plurality of network connected devices, comprising:
   at least one processor executing a code for:
   for each unstructured text of a plurality of unstructured texts for the plurality of network connected devices, wherein the plurality of unstructured texts are extracted by different code sensors from different applications, wherein each unstructured text indicates an identity of at least one software installed on at least one device of the plurality of network connected devices:
   dividing the unstructured text into at least one token;
   classifying the at least one tokens to at least one software parameter using at least one classification dataset, for obtaining a plurality of software parameters for the unstructured text;
   matching subsets of permutations of the plurality of software parameters and corresponding ones of the at least one tokens to a plurality of unique software identifiers defined by a common structured format;
   selecting one unique software identifier from the plurality of unique software identifiers according to a set of rules; and generating a text satisfying the common structured format, the text indicating at least one unique software installed on each device of the plurality of network connected devices;

analyzing at least one of the plurality of unique software identifiers indicated for the plurality of network connected devices as installed on each device thereof to identify at least one unique software product for which a security vulnerability is known; and generating instructions for obtaining a patch for the security vulnerability and installing the patch on at least one device of the plurality of network connected devices on which a respective one of the at least one unique software product with the security vulnerability is installed.

2. The computing device of claim 1, further comprising:
analyzing at least one of the plurality of unique software identifiers indicated for the plurality of network connected devices as installed on each device thereof to identify at least one unique software product installed as an older version for which an update for installation is available; and generating instructions for obtaining the update and installing the update on at least one device of the plurality of network connected devices on which the older version of the at least one unique software product is installed.

3. The computing device of claim 1, further comprising:
analyzing at least one of the plurality of unique software identifiers indicated for the plurality of network connected devices as installed on each device thereof in view of available licenses to identify at least one of: unique software products without an associate license, and surplus licenses not being used.

4. The computing device of claim 1, wherein the at least one code sensor extracts data from at least one application from the different applications that at least one of: interacts, manages, and monitors, with the at least one unique software installed on the device of the plurality of network connected devices for which the unique software identifier is being determined.

5. The computing device of claim 4, wherein the at least one application is selected from a group consisting of: device and user management consoles, endpoint security agents, networking, identity access management, vulnerability management, patch management, and cloud provider.

6. The computing device of claim 1, wherein the common structured format is defined by a common platform enumeration (CPE) structured name scheme.

7. The computing device of claim 1, further comprising looking up a respective one of the at least one token of the unstructured text in an alias dataset that maps aliases to words, to identify at least one word, and adding the at least one word to the at least one token, wherein the classifying includes the at least one token.

8. The computing device of claim 1, wherein the classification dataset is implemented as at least one directed acyclic graph (DAG), wherein each vertex of the at least one DAG denotes a single word, and an edge between vertices denotes a sequence of related words.

9. The computing device of claim 8, wherein the classifying is performed by finding a root vertex with a first word, and tracing a path in the DAG to addition vertices corresponding to additional words by connected edges, until a leaf vertex is reached.

10. The computing device of claim 9, further comprising merging at least two respective ones of the at least one token of the unstructured text into a single token according to the path that passes through at least two vertices connected by an edge.

11. The computing device of claim 1, wherein the at least one software parameter is selected from a group comprising: software product, vendor, version, architecture, and year.

12. The computing device of claim 1, wherein matching comprises identifying a vendor, identifying a software product, and identifying that the vendor has the software product in an inventory.

13. The computing device of claim 12, wherein when a plurality of vendors having the same software product in a plurality of inventories are found, a single vendor with widest distribution of the same software product is selected.

14. The computing device of claim 12, wherein the software product is identified from respective ones of the at least one tokens that are unclassified as vendors.

15. The computing device of claim 1, wherein the set of rules for selecting the one unique software identifier includes selecting according to widest distribution.

16. The computing device of claim 1, wherein the set of rules for selecting the one unique software identifier includes removing the unique software identifiers indicating an operating system.

17. The computing device of claim 1, wherein the unstructured text comprises free-text.

18. The computing device of claim 1, wherein the at least one classification dataset comprises a plurality of software products obtained from at least one data source.

19. The computing device of claim 1, wherein when a token is not found in the at least one classification dataset, further comprising determining the at least one software parameter according to an analysis of the token identified in a plurality of environment.

20. A method for identifying unique software installed on a plurality of network connected devices, comprising:
using at least one processor for:
for each unstructured text of a plurality of unstructured texts for the plurality of network connected devices, wherein the plurality of unstructured texts are extracted by different code sensors from different applications, wherein each unstructured text indicates an identity of at least one software installed on at least one device of the plurality of network connected devices:

dividing the unstructured text into at least one token;

classifying the at least one tokens to at least one software parameter using at least one classification dataset, for obtaining a plurality of software parameters for the unstructured text;

matching subsets of permutations of the plurality of software parameters and corresponding ones of the at least one tokens to a plurality of unique software identifiers defined by a common structured format;

selecting one unique software identifier from the plurality of unique software identifiers according to a set of rules; and generating a text satisfying the common structured format, the text indicating at least one unique software installed on each device of the plurality of network connected devices;

analyzing at least one of the plurality of unique software identifiers indicated for the plurality of network connected devices as installed on each device thereof to identify at least one unique software product for which a security vulnerability is known; and generating instructions for obtaining a patch for the security vulnerability and installing the patch on at least one device of the plurality of network connected devices on which a respective one of the at least one unique software product with the security vulnerability is installed.

21. A non-transitory medium storing program instructions for identifying unique software installed on a plurality of network connected devices, which, when executed by at least one processor, cause the at least one processor to:
for each unstructured text of a plurality of unstructured texts for the plurality of network connected devices, wherein the plurality of unstructured texts are extracted by different code sensors from different applications, wherein each unstructured text indicates an identity of at least one software installed on at least one device of the plurality of network connected devices:
dividing the unstructured text into at least one token;
classifying the at least one tokens to at least one software parameter using at least one classification dataset, for obtaining a plurality of software parameters for the unstructured text;
matching subsets of permutations of the plurality of software parameters and corresponding ones of the at least one tokens to a plurality of unique software identifiers defined by a common structured format;
selecting one unique software identifier from the plurality of unique software identifiers according to a set of rules; and
generating a text satisfying the common structured format, the text indicating at least one unique software installed on each device of the plurality of network connected devices;
analyzing at least one of the plurality of unique software identifiers indicated for the plurality of network connected devices as installed on each device thereof to identify at least one unique software product for which a security vulnerability is known; and
generating instructions for obtaining a patch for the security vulnerability and installing the patch on at least one device of the plurality of network connected devices on which a respective one of the at least one unique software product with the security vulnerability is installed.

* * * * *